United States Patent

Grandhi et al.

Patent Number: 6,125,280
Date of Patent: Sep. 26, 2000

[54] AUTOMATIC NEIGHBOR IDENTIFICATION IN A CELLULAR SYSTEM

[75] Inventors: Sudheer A. Grandhi, Lake Hiawatha; Joe Huang, Bloomfield; Colin L. Kahn, Cedar Knolls; Krishnan Kumaran, Scotch Plains; Bulin B. Zhang, Branchburg, all of N.J.

[73] Assignee: Lucent Technologies Inc., Murray Hill, N.J.

[21] Appl. No.: 09/044,661

[22] Filed: Mar. 19, 1998

[51] Int. Cl.$^7$ .................................................. H04Q 7/20
[52] U.S. Cl. .......................... 455/446; 455/450; 455/561
[58] Field of Search .................... 455/446, 452, 455/453, 450, 515, 434, 435, 438, 439, 561, 403, 448, 463, 465; 370/328, 329, 331, 332

[56] References Cited

U.S. PATENT DOCUMENTS

| | | | |
|---|---|---|---|
| 4,771,448 | 9/1988 | Koohgoli et al. | 455/450 |
| 5,422,930 | 6/1995 | McDonald et al. | 455/454 |
| 5,437,868 | 8/1995 | Oakes et al. | 424/405 |
| 5,448,750 | 9/1995 | Eriksson et al. | 455/33.1 |
| 5,471,671 | 11/1995 | Wang et al. | 455/226.2 |
| 5,519,884 | 5/1996 | Duque-Anton et al. | 455/33.1 |
| 5,535,259 | 7/1996 | Dent et al. | 455/561 |
| 5,546,443 | 8/1996 | Raith | 455/450 |
| 5,586,170 | 12/1996 | Lea | 379/60 |
| 5,590,395 | 12/1996 | Diekelman | 455/13.1 |
| 5,669,062 | 9/1997 | Olds et al. | 455/509 |
| 5,724,665 | 3/1998 | Abbasi et al. | 455/561 |
| 5,809,423 | 9/1998 | Benveniste | 455/452 |
| 5,826,189 | 10/1998 | Thapa et al. | 455/428 |
| 5,839,075 | 11/1998 | Haartsen et al. | 455/450 |
| 5,862,479 | 1/1999 | Cutler, Jr. et al. | 455/428 |
| 5,886,988 | 3/1999 | Yun et al. | 370/329 |
| 5,887,263 | 3/1999 | Ishii | 455/452 |
| 5,926,763 | 7/1999 | Greene, Sr. et al. | 455/450 |
| 5,940,768 | 9/1988 | Thro et al. | 455/507 |
| 5,946,625 | 8/1999 | Hassan et al. | 455/447 |
| 5,956,643 | 9/1999 | Benveniste | 455/452 |
| 5,991,622 | 11/1999 | Henry, Jr. | 455/434 |

FOREIGN PATENT DOCUMENTS

| | | |
|---|---|---|
| WO 97 06648 | 2/1997 | WIPO . |
| WO 97 32445 | 9/1997 | WIPO . |
| WO 99 00999 | 1/1999 | WIPO . |

*Primary Examiner*—Dwayne D. Bost
*Assistant Examiner*—Quochien B. Vuong
*Attorney, Agent, or Firm*—Steve Mendelsohn

[57] ABSTRACT

In a cellular system, a new cell measures signal strengths of different channels being used by existing cells. The new cell generates a list of candidate channels corresponding to the channels with the greatest signal strength and transmits the list to the mobile switching center (MSC) of the cellular system. The MSC determines which of the candidate channels correspond to beacons in existing cells and transmits configuration information to the new cell for those corresponding existing cells. In this way, the new cell automatically receives configuration information on its neighbor cells. If the MSC determines that the number of candidate channels that are beacons is too small, the MSC will ask the new cell to transmit additional candidate channels (i.e., those having even lower signal strength).

16 Claims, 3 Drawing Sheets

AUTOMATIC NEIGHBOR IDENTIFICATION IN A CELLULAR SYSTEM

BACKGROUND OF THE INVENTION

1. Field of the Invention

The present invention relates to communications, and, in particular, to cellular telecommunication systems.

2. Description of the Related Art

A typical cellular telecommunication system has one or more mobile switching centers (MSCs), for example, located in the central offices of a company that provides telecommunication services, where each MSC controls the operations of multiple cell sites. A cell site (also referred to as a cell) corresponds to a set of co-located uplink and downlink antennas that support communications with the mobile units (e.g., cellular telephones) currently located within a coverage area around the cell site. The locations of cell sites are preferably distributed to provide contiguous coverage over a relatively wide telecommunication service region. In order to ensure this contiguous coverage, cell sites are positioned such that their coverage areas overlap to some extent with the coverage areas of adjacent cell sites. This overlapping also enables a mobile user to move from one cell site to another without losing telecommunication service. This process is referred to as a handoff, as the responsibility for communicating with the mobile unit is handed off (i.e., transferred) from one cell site to the other.

One type of cellular system uses both frequency division multiple access (FDMA) and time division multiple access (TDMA) communication techniques. Such a cellular system is typically assigned two different frequency bands for its communications: one for downlink communications from the cell sites to the mobile units and the other for uplink communications from the mobile units to the cell sites. Pursuant to FDMA schemes, each frequency band is divided into multiple frequency sub-bands called channels. Pursuant to TDMA schemes, communications on each channel are time-multiplexed into different periodic time slots. When communications are to be established between a cell site and a mobile unit located within the coverage area of the cell site, the mobile unit is assigned a particular channel and time slot in each of the downlink and uplink frequency bands within which signals to and from the mobile unit are to be transmitted. Responsibility for assigning channels and time slots rests with the MSC, which is constantly receiving information from and transmitting instructions to its cell sites.

In typical cellular systems, when a new cell is deployed or a new sector on an existing cell is configured, neighbor cells and sectors must be identified for the new cell or sector. In addition, existing cells must be reconfigured to identify the new cell or sector as a neighbor. This process is necessary to allow correct operation of both handoff and control channel reselection processes such as those described in the IS-136 TDMA Standard. Handoff processes use neighbor information to help decide the most appropriate sector or cell to serve a call. Control channel reselection processes use similar neighbor information to determine which cell an idle mobile (one powered-up, but not active on a call) will monitor to receive incoming calls and other mobile services.

A typical cellular system today must rely on manual entry by a technician of neighbor information associated with each cell. This information typically consists of the channel number of a beacon on the neighbor sector or cell. This channel is active at all times and is monitored by mobiles on neighbor cells. The signal strength may be reported back to the serving cell site in Mobile Assisted Channel Allocation (MACA) and Mobile Assisted Handoff (MAHO) processes, or may be used internally by the mobile in Control Channel Reselection processes.

If channel numbers corresponding to neighbor beacon channels were the only information needed to identify neighbors, configuration of cellular and PCS systems would not be terribly burdensome to service providers. However, typically at least a dozen additional parameters need to be specified for each neighbor sector. These parameters include indicators that support hierarchical cells (such as a "preferred," "regular," or "non-preferred" neighbor designation), signal-strength thresholds that determine whether a mobile is allowed to access or be handed off to a neighbor cell, timer parameters that specify how long the signal strength must be at acceptable levels before access on the neighbor cell is permitted, and indicators of what services are supported on a particular neighbor.

With the maturation of cellular systems, indicators of advanced service support on neighbor cells becomes particularly burdensome for the service provider to configure and identify. This is because multiple advanced services such as private system support, fax and data capability, and short message service must each be identified on a per-neighbor basis. This per-neighbor identification allows, for example, handoff algorithms to preferentially maintain mobiles on cells that support a particular service such as a specific private system.

SUMMARY OF THE INVENTION

The present invention is a method for automatically identifying neighboring cell sites and sectors in a cellular or wireless system, such as TDMA cellular/PCS systems. Essentially each cell or sector identifies potential neighbors based on signal-strength information on downlink transmissions from other cells or sectors in the neighborhood. Channels with strong signal strength are then checked in a central database to determine whether they correspond to known beacon channels on neighbor cells. Neighbor cells that are identified in this manner are sent requests to measure a specified test channel that is known to be active on the new cell. Only cells that report that the signal strength on the test channel exceeds a threshold are determined to be neighbors of the new cell. This automatic neighbor identification (ANI) scheme lends itself to distributed implementation on a per cell or sector basis. Especially in the case of indoor wireless systems, this method eliminates tedious manual processes for signal measurement in order to identify neighbors.

According to one embodiment, the present invention is a method for automatically identifying neighbors when a new cell is added in a cellular system having a mobile switching center (MSC) and a plurality of existing cells. The new cell measures signal strengths in different channels and transmits a list of candidate channels to the MSC. The MSC determines which candidate channels correspond to beacons in existing cells, queries candidate neighbor cells to measure and report back reciprocal signal strengths, and transmits configuration information to the new cell for each corresponding existing cell that measures a signal strength greater than a specified threshold.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
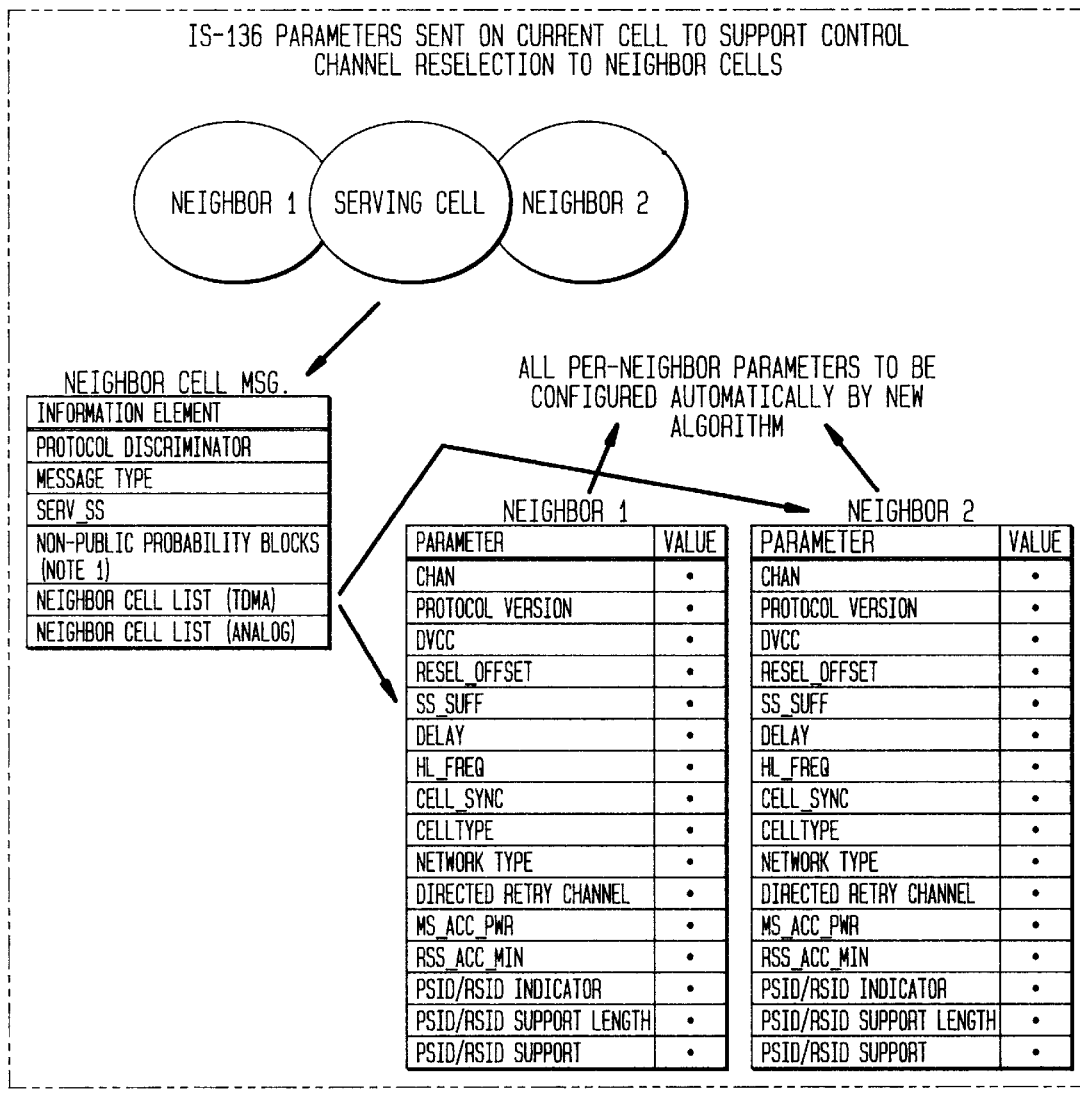
FIG. 1 shows a typical set of parameters that must be specified to support the Control Channel Reselection process for just two neighbor cells in an IS-136 TDMA system.

FIG. 1 shows a typical set of parameters that must be specified to support the Control Channel Reselection process for just two neighbor cells in an IS-136 TDMA system. The present invention provides automatic identification of neighbor cells, and configuration of neighbor cell information such as the parameters listed under "Neighbor 1" and "Neighbor 2" in FIG. 1, given that the information has been configured once for the neighbor cell itself.

Figure 2:
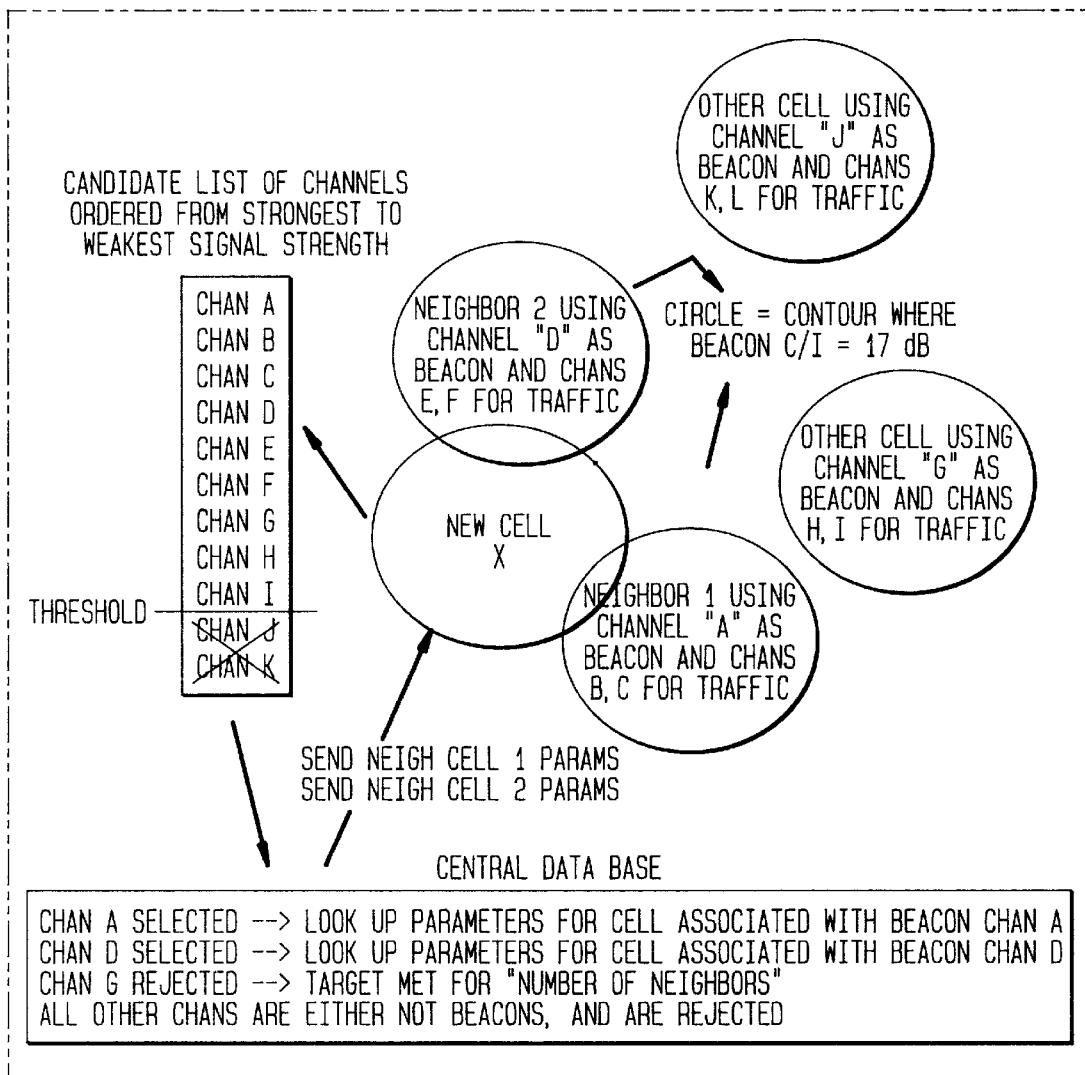
FIG. 2 depicts the algorithm for the automatic neighbor identification and configuration processes of the present invention, which is divided into two portions.

FIG. 2 depicts the algorithm for the automatic neighbor identification and configuration processes of the present invention, which is divided into two portions. A new cell or sector monitors the downlink energy transmitted on channels in the cellular or PCS band in which it operates. Typically, the signal strength C relative to the interference I received at the new cell will not be sufficient to decode digital information broadcast on neighbor cells. This is because cells are usually spaced so that their downlink C/I is sufficient to decode digital information only up to the cell boundary. This is typically at least one cell radius away from the new cell being configured, as shown in FIG. 1.

Although signal strength from neighbor cells may not be sufficient to read digital information, it is typically sufficient to detect the presence of an active channel. Hence, the new cell constructs a candidate list of potential neighbor channels by ranking the downlink energy it monitors on all channels. The channels with the highest energy (above a threshold) are sent to the mobile switching center (MSC) where a database is queried. Sectors/cells corresponding to channels that are identified in the database as beacon or control channels (the downlink on these channels is always active) are then sent requests to measure a test channel that is known to be active on the new cell. Neighbor cells/sectors that report a sufficiently high measurement on the test channel are then designated as neighbor cells or sectors to the new cell/sector. The MSC preferably limits the number of identified neighbors to some maximum N. Information corresponding to each neighbor sector is then extracted from the database and sent to the new cell, which may then configure its MAHO Neighbor lists and Control Channel Reselection lists.

If less than N neighbors are identified, the MSC may request additional candidate channels from the cell. The cell then sends additional channels that fell below the original threshold, but are above a lower threshold. This process may be repeated as necessary until it is determined that there are a sufficient number of neighbors.

Figure 3:
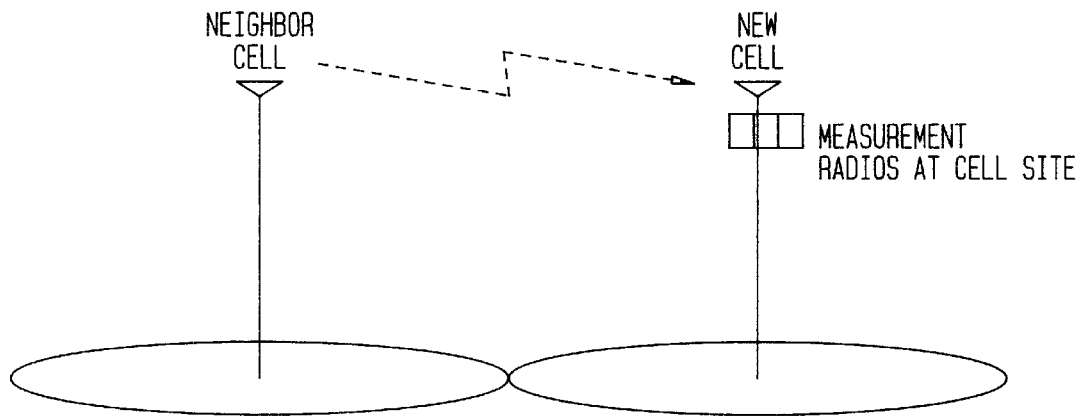
FIG. 3 shows a new cell site measuring the signal strength from a neighbor cell in order to prepare the candidate list to be sent to the central database.

FIG. 3 shows a new cell site measuring the signal strength from a neighbor cell in order to prepare the candidate list to be sent to the central database. The algorithm is summarized in the following bullet list:

At the new cell site, the signal strengths of beacons are not strong enough (C/I<17 dB) to decode digital information about neighbors. Nevertheless, the new cell site constructs a candidate list of channels ordered from strongest to weakest, keeping on the list only those channels having a signal strength above a specified threshold.

The new cell site sends a request to the central database in the MSC.

New cell starts to transmit at frequency which is not used by others (i.e., the test channel).

At the MSC, channels are examined to see if they are beacon channels on neighbor cells.

Candidate neighbor cells are sent a message requesting that a measurement be made on a test channel. Up to N neighbors that report measurements that exceed a threshold are identified.

For each identified neighbor, a message is sent to the new cell site giving configuration information for the neighbor.

If less than N neighbors are identified, a request may be sent to the new cell site to send more candidates, including channels that had a signal strength below the original threshold, but above a second lower threshold.

The process may be repeated until N neighbors are identified.

Once a new cell is operational, both downlink measurements made at the cell site and measurements received from mobiles may be used to periodically reconfigure neighbor lists. For IS-136 mobiles, this information may be obtained using Mobile Assisted Handoff (MAHO) and/or Mobile Assisted Channel Allocation (MACA) processes.

Alternatively, measurement radios may be distributed in the cell and placed at strategic locations. These measurement radios can be used to measure downlink carrier power from neighbor cells. The measurements from these radios would be dependent on their locations and hence could be different. The maximum or some linear combination of these measurements could be used to form a candidate list. The measurements by a measurement radio may be reported back to the cell site on a radio channel or on a wired link as shown in FIGS. 4 and 5.

Figure 4:
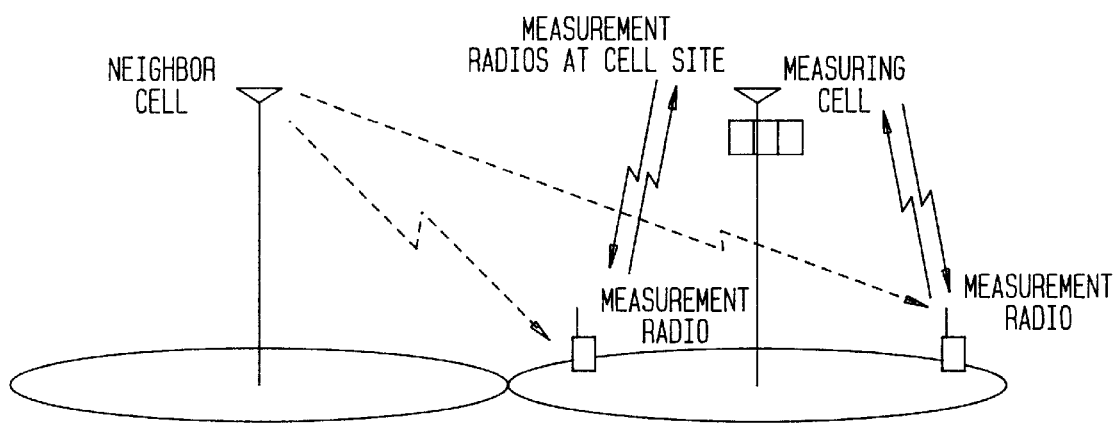
FIGS. 4 and 5 show two different schemes in which two measurement radios are distributed at strategic locations in a measuring cell.
Figure 5:
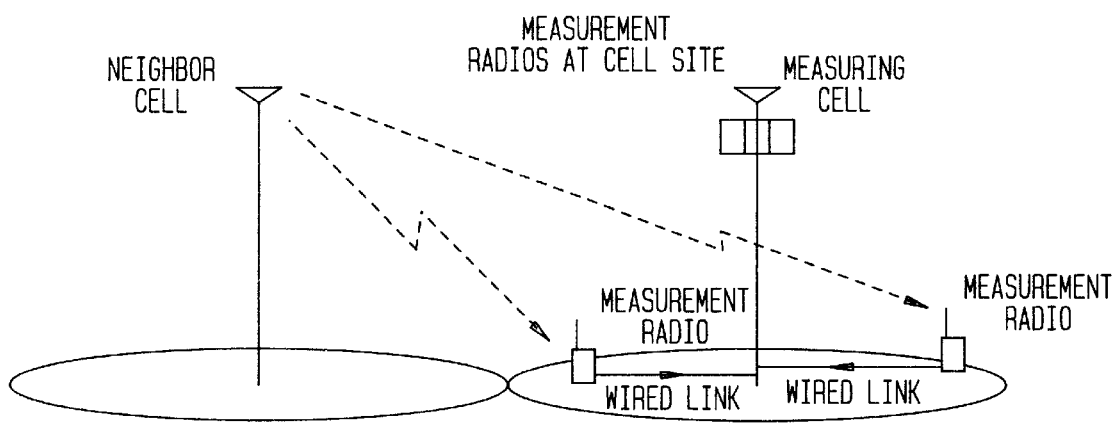

Both FIGS. 4 and 5 show two measurement radios distributed at strategic locations in a measuring cell. In FIG. 4, the measurement radios report signal power from neighbor cells back to the cell site on a radio channel link. In FIG. 5, the measurement radios report signal power from a neighbor cell back to the cell site on a wired link.

After a cell has constructed a candidate list, the update process is identical as for configuring a new cell/sector. The candidate list is sent to the central database which identifies channels that are beacons on neighbor cells. Parameters associated with these neighbors are sent back to the measuring cell which then reconfigures its neighbor lists.

The present invention may be used at the time of system initialization of new of cells or sectors. It may also be used by active cells to update their neighbor lists. The neighbor identification is on a per-cell basis and the procedure may be implemented in a distributed manner on a per cell basis.

When a control or beacon channel is assigned to a new cell, all neighbor cells that have been identified in the process described above are sent the beacon/control channel number of the new cell as well as other information associated with accessing the new cell for handoff or to request service.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for automatically identifying neighbors when a new cell is added in a cellular system having a mobile switching center (MSC) and a plurality of existing cells, wherein:

the new cell measures signal strengths in different channels and transmits a list of candidate channels to the MSC; and the MSC determines which candidate channels correspond to beacons in existing cells, queries candidate neighbor cells to measure and report back reciprocal signal strengths, and transmits configuration information to the new cell for each corresponding existing cell that measures a signal strength greater than a specified threshold.

2. The invention of claim 1, wherein the new cell orders the candidate channels from strongest to weakest.

3. The invention of claim 1, wherein the new cell rejects channels having a signal strength less than a first signal-strength threshold.

4. The invention of claim 1, wherein the MSC ignores candidate channels corresponding to traffic in existing cells.

5. The invention of claim 1, wherein, if the number of candidate channels corresponding to beacons is less than a specified threshold, then the MSC transmits a request to the new cell to identify additional candidate channels having a signal strength less than a first signal-strength threshold, but greater than a second, lower signal-strength threshold.

6. The invention of claim 1, wherein the new cell comprises one or more measurement radios positioned within the new cell site to measure the signal strengths in the different channels.

7. The invention of claim 6, wherein the measurements by each measurement radio are reported back to the cell either on a radio channel or on a wired link.

8. The invention of claim 1, wherein, for each candidate channel identified by the MSC as corresponding to a beacon in an existing cell, the MSC transmits to the existing cell configuration information for the new cell, thereby identifying the new cell as a neighbor of the existing cell.

9. The invention of claim 1, wherein the method is repeated after the new cell is operational to update the neighbor configuration information.

10. The invention of claim 1, wherein:

the new cell orders the candidate channels from strongest to weakest;

the new cell rejects channels having a signal strength less than a first signal-strength threshold;

the MSC ignores candidate channels corresponding to traffic in existing cells;

if the number of candidate channels corresponding to beacons is less than a specified threshold, then the MSC transmits a request to the new cell to identify additional candidate channels having a signal strength less than a first signal-strength threshold, but greater than a second, lower signal-strength threshold;

the new cell comprises one or more measurement radios positioned within the new cell site to measure the signal strengths in the different channels, wherein the measurements by each measurement radio are reported back to the cell either on a radio channel or on a wired link;

for each candidate channel identified by the MSC as corresponding to a beacon in an existing cell, the MSC transmits to the existing cell configuration information for the new cell, thereby identifying the new cell as a neighbor of the existing cell; and the method is repeated after the new cell is operational to update the neighbor configuration information.

11. A cellular system, comprising:

(a) a mobile switching center (MSC); and (b) a plurality of existing cells, communicating with the MSC, wherein, when a new cell is added to the cellular system:

the new cell measures signal strengths in different channels and transmits a list of candidate channels to the MSC; and the MSC determines which candidate channels correspond to beacons in existing cells, queries candidate neighbor cells to measure and report back reciprocal signal strengths, and transmits configuration information to the new cell for each corresponding existing cell that measures a signal strength greater than a specified threshold.

12. The invention of claim 11, wherein, if the number of candidate channels corresponding to beacons is less than a specified threshold, then the MSC transmits a request to the new cell to identify additional candidate channels having a signal strength less than a first signal-strength threshold, but greater than a second, lower signal-strength threshold.

13. A mobile switching center (MSC) for a cellular system further comprising a plurality of existing cells, wherein, when a new cell is added to the cellular system:

the new cell measures signal strengths in different channels and transmits a list of candidate channels to the MSC; and the MSC determines which candidate channels correspond to beacons in existing cells, queries candidate neighbor cells to measure and report back reciprocal signal strengths, and transmits configuration information to the new cell for each corresponding existing cell that measures a signal strength greater than a specified threshold.

14. The invention of claim 13, wherein, if the number of candidate channels corresponding to beacons is less than a specified threshold, then the MSC transmits a request to the new cell to identify additional candidate channels having a signal strength less than a first signal-strength threshold, but greater than a second, lower signal-strength threshold.

15. A cell for a cellular system further comprising a mobile switching center (MSC) and one or more existing cells, wherein, when the cell is a new cell added to the cellular system:

the new cell measures signal strengths in different channels and transmits a list of candidate channels to the MSC; and the MSC determines which candidate channels correspond to beacons in existing cells, queries candidate neighbor cells to measure and report back reciprocal signal strengths, and transmits configuration information to the new cell for each corresponding existing cell that measures a signal strength greater than a specified threshold.

16. The invention of claim 15, wherein, if the number of candidate channels corresponding to beacons is less than a specified threshold, then the MSC transmits a request to the new cell to identify additional candidate channels having a signal strength less than a first signal-strength threshold, but greater than a second, lower signals strength threshold.

* * * * *